(12) United States Patent
Nagae et al.

(10) Patent No.: US 7,161,262 B2
(45) Date of Patent: Jan. 9, 2007

(54) START CONTROL APPARATUS

(75) Inventors: Toshihiro Nagae, Aichi (JP); Masaki Yoshino, Aichi (JP); Hisashi Kato, Aichi (JP); Toru Maeda, Aichi (JP); Masaki Hayashi, Aichi (JP); Tomoyuki Funayama, Toyota (JP); Toshio Asahi, Toyota (JP); Tomoo Kakegawa, Toyota (JP); Toshinori Aoki, Toyota (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 496 days.

(21) Appl. No.: 10/404,344

(22) Filed: Apr. 1, 2003

(65) Prior Publication Data

US 2004/0004397 A1 Jan. 8, 2004

(30) Foreign Application Priority Data

Apr. 1, 2002 (JP) ............................ 2002-098651

(51) Int. Cl.
*B60R 25/04* (2006.01)
*B60R 25/10* (2006.01)
*H01H 27/00* (2006.01)

(52) U.S. Cl. ................ 307/10.4; 180/287; 340/426.11; 340/426.13; 340/426.28

(58) Field of Classification Search ............... 307/10.4; 340/426.11, 426.13, 426.28; 180/287
See application file for complete search history.

(56) References Cited

U.S. PATENT DOCUMENTS 5,801,614 A * 9/1998 Kokubu ................... 340/425.5
5,818,330 A * 10/1998 Schweiger ............. 340/426.13
6,400,041 B1 * 6/2002 Engelmann et al. ........ 307/10.2
2004/0027239 A1 * 2/2004 Hayashi et al. ............ 340/5.61
2004/0046453 A1 * 3/2004 Hayashi et al. ............ 307/10.5
2005/0138977 A1 * 6/2005 Suzuki et al. ................. 70/186

FOREIGN PATENT DOCUMENTS

| DE | 19642616 | 4/1998 |
| DE | 19945867 | 9/1999 |
| DE | 19860350 | 6/2000 |
| JP | 2001-001865 | 1/2001 |

OTHER PUBLICATIONS

Office Action, dated Apr. 30, 2004, issued in corresponding Chinese Application No. 03109016.8.
French Search Report, dated Sep. 1, 2004, issued in corresponding French Application No. FR0303996.

* cited by examiner

*Primary Examiner*—Brian Sircus
*Assistant Examiner*—Hai I. Kaplan
(74) *Attorney, Agent, or Firm*—Synnestvedt & Lechner LLP (57) ABSTRACT

A start control apparatus has a steering lock mechanism, which includes a lock pin and a lock control unit. The lock pin is selectively engaged and disengaged from the steering shaft. The lock control unit controls the lock pin. The start control apparatus further includes a portable communication device, a verification control unit, which communicates with the portable communication device, a power source control unit, which control power supply, an engine control unit, which controls the engine, a lock state detecting switch, which detects an engaged state and a disengaged state of the lock pin. The lock control unit and the power source control unit monitor detection signals from the lock state detecting switch. The engine is permitted to be started on condition that the control units acknowledge that the lock bar is in the disengaged state.

13 Claims, 3 Drawing Sheets

START CONTROL APPARATUS

BACKGROUND OF THE INVENTION

The present invention relates to a start control apparatus, and more specifically, to a start control apparatus that selectively starts and stops an engine by a one-push operation.

In addition to improvement of the basic performance and safety of automobiles, it is desired that operability be improved these days. An engine start/stop control system having a smart ignition function is proposed to improve the operability. In such engine start/stop control system, when a portable communication device is carried into a vehicle passenger compartment by an owner (driver) of a vehicle, the portable communication device automatically communicates with an engine control apparatus arranged in the vehicle. The engine can be started only when a mutual communication is established between the portable communication device and the engine control apparatus. The engine is selectively started and stopped in accordance with operation of a start/stop manipulating member located inside the vehicle passenger compartment. After getting on the vehicle, the driver can start or stop the engine only by operating the start/stop manipulating member. Thus, the operability is improved.

To further simplify the start/stop operation of the engine, a push button switch is used as the start/stop manipulating member. A one-push type engine start/stop control system has been proposed that selectively starts and stops the engine in accordance with the operation of the push button switch.

On the other hand, to prevent the vehicle from being stolen, a steering lock mechanism is provided on the vehicle. The steering lock mechanism restricts rotation of a steering wheel when the vehicle is in a parking state to prevent the vehicle from being stolen. More specifically, in the steering lock mechanism of the vehicle that has the one-push type engine start/stop control system, a lock bar is selectively engaged with a steering shaft. The lock bar is driven by an actuator, which is controlled by a lock control unit.

The engine is started only when the steering lock mechanism is reliably released. That is, although the push button switch is pressed when the mutual communication between the portable communication device and the engine control apparatus is established, the engine will not start if the steering lock mechanism is not released. Therefore, in the conventional system, the engine is started when the steering lock mechanism is released while the mutual communication between the portable communication device and the engine control apparatus is established, and the push button switch is subsequently pressed.

The steering lock mechanism has a lock state detecting device for detecting whether the lock bar is engaged with or disengaged from the steering shaft. The lock control unit monitors engaged or disengaged state of the lock bar with respect to the steering shaft based on detection signals sent from the lock state detecting device. Therefore, when the lock control unit determines that the lock bar is disengaged from the steering shaft, the engine is permitted to be started.

In the conventional system, only the lock control unit monitors the engaged or disengaged state of the lock bar. However, to more reliably prevent the engine from being permitted to be started while the lock bar is in the engaged state, it is required to more accurately determine the engaged and disengaged states of the lock bar.

SUMMARY OF THE INVENTION

Accordingly, the objective of the present invention is to provide a start control apparatus that reliably prevents an engine from being started while a movable member, such as a steering shaft, is locked.

To achieve the above objective, the present invention provides a start control apparatus for controlling the starting of an engine of a vehicle. The start control apparatus includes an antitheft mechanism, a portable communication device, a communication control unit, a power source control unit, an engine control unit, a driver switch, and a lock state detecting device. The antitheft mechanism has a lock member, which selectively engages with and disengages from a movable member located on the vehicle; an actuator, which drives the lock member; and a lock control unit, which controls the actuator. The portable communication device is held by an occupant of the vehicle. When the portable communication device is carried into a vehicle passenger compartment, the communication control unit communicates with the portable communication device. The power source control unit controls a supply of power to electrical components of the vehicle based on a communication between the power source control unit and the communication control unit. The engine control unit controls the engine based on a communication between the engine control unit and the communication control unit and a communication between the engine control unit and the power source control unit. The driver switch is located inside the vehicle passenger compartment and is manipulated to start the engine. The lock state detecting device detects an engaged state and a disengaged state of the lock member with respect to the movable member. At least two of the lock control unit, the communication control unit, the power source control unit, and the engine control unit function as monitor control units. The monitor control units monitor detection signals sent from the lock state detecting device. The engine is permitted to be started on condition that all the monitor control units acknowledge the disengaged state of the lock member.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A one-push type engine start/stop control system 1 according to a first embodiment of the present invention will now be described with reference to FIGS. 1 to 3. The one-push type engine start/stop control system 1 is mounted to a vehicle that has an electronic steering lock mechanism.

Figure 1:
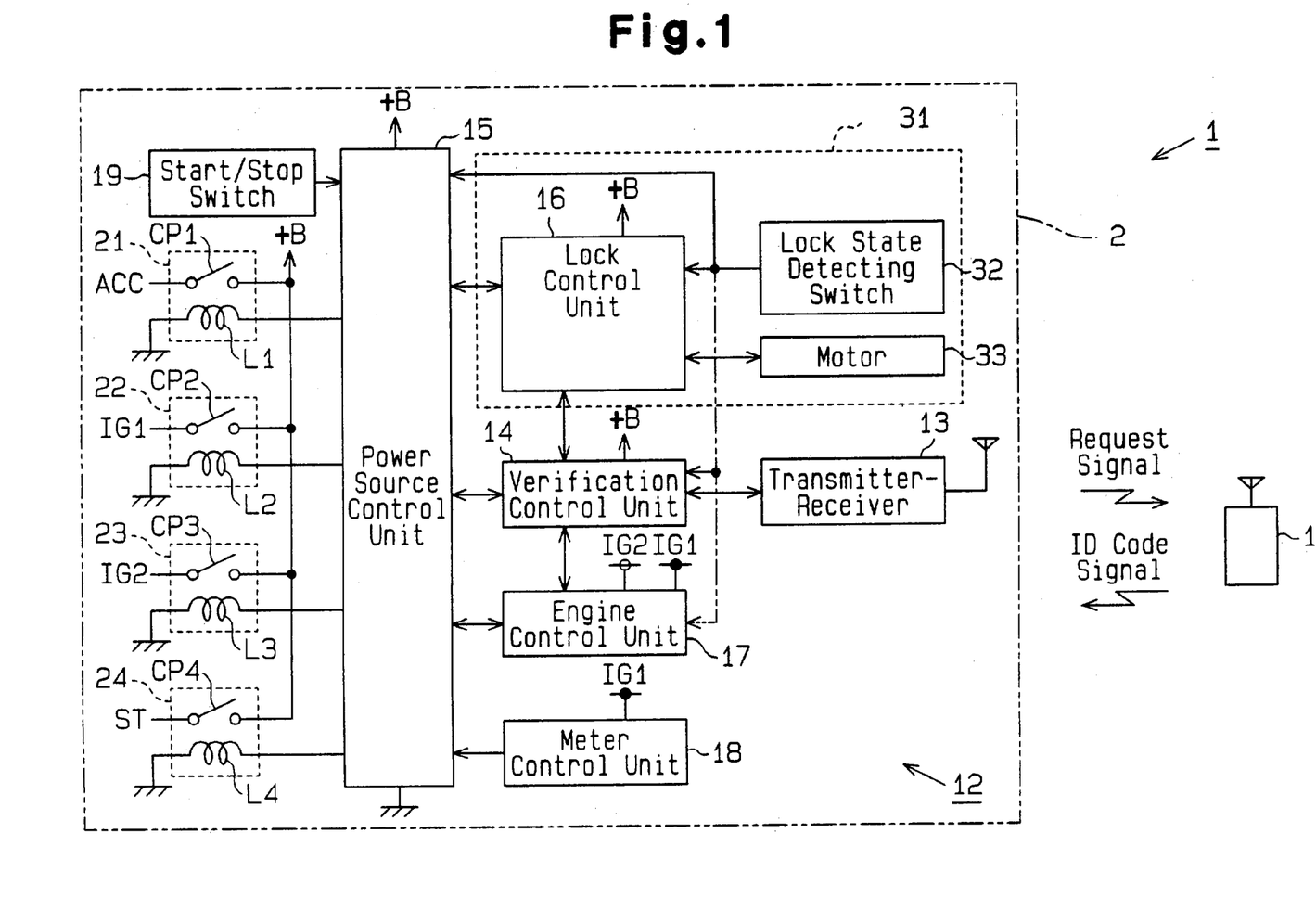
FIG. 1 is a block diagram showing a schematic configuration of an engine start/stop control system according to a first embodiment of the present invention.

As shown in FIG. 1, the one-push type engine start/stop control system 1 includes a portable communication device 11 and a vehicle control unit 12, which is arranged in a vehicle 2. The vehicle control unit 12 includes a steering lock mechanism 31. The portable communication device 11 is held by an occupant, such as a driver or a fellow passenger of the vehicle, and mutually communicates with the vehicle control unit 12. More specifically, when receiving a request signal sent from the vehicle control unit 12, the portable communication device 11 automatically transmits an ID code signal, which includes a predetermined ID code. The ID code signal is transmitted as an electric wave of a predetermined frequency (for example, 300 MHz).

The vehicle control unit 12 includes a transmitter-receiver 13, a communication control unit, which is a verification control unit 14 in this embodiment, a power source control unit 15, a lock control unit 16, an engine control unit 17, a meter control unit 18, and a driver switch, which is a push-button type start/stop switch 19 in this embodiment. Each of the control units 14 to 18 is formed by a control unit, which includes a CPU, a ROM, and a RAM (not shown). The verification control unit 14 is electrically connected to the transmitter-receiver 13, the power source control unit 15, the lock control unit 16, and the engine control unit 17. The power source control unit 15 is electrically connected to the lock control unit 16, the engine control unit 17, the meter control unit 18, and the push-button type start/stop switch 19. The verification control unit 14, the lock control unit 16, the engine control unit 17, and the meter control unit 18 are electrically connected to a communication pathway, which is not shown.

The transmitter-receiver 13 modulates a request signal sent from the verification control unit 14 to an electric wave of a predetermined frequency (for example, 134 kHz), and sends the electric wave to the interior of the vehicle passenger compartment. When receiving an ID code signal transmitted from the portable communication device 11 via an antenna, the transmitter-receiver 13 demodulates the ID code signal to a pulse signal and sends the pulse signal to the verification control unit 14.

The verification control unit 14 intermittently sends request signals to the transmitter-receiver 13. When receiving the ID code signal from the transmitter-receiver 13, the verification control unit 14 compares the ID code included in the ID code signal with the ID code that is stored in the verification control unit 14 in advance. That is, the verification control unit 14 performs verification of ID code. If, as a result, the ID codes are identical with each other, the verification control unit 14 sends a lock release request signal to the lock control unit 16. When receiving a lock release complete signal from the lock control unit 16, the verification control unit 14 sends a start permit signal to the power source control unit 15 and the engine control unit 17. On the other hand, if the ID codes are not identical, the verification control unit 14 sends a start prohibit signal to the power source control unit 15 and the engine control unit 17. When receiving an engine drive signal representing that the engine is running from the power source control unit 15, the verification control unit 14 stops sending the request signals to the transmitter-receiver 13. In the first embodiment, each of the lock release request signal, the lock release complete signal, the start permit signal, the start prohibit signal, and the engine drive signal is a binary signal that consists of a predetermined number of bits having a certain pattern. When an abnormality, such as a short circuit or malfunction, occurs in the communication pathway between the verification control unit 14 and the control units 15 to 17, the pattern of the binary signal is changed. Therefore, the control units 14 to 17 can detect the abnormality.

The power source control unit 15 is connected to coils L1 to L4 of an accessory relay (ACC relay) 21, a first ignition relay (IG1 relay) 22, a second ignition relay (IG2 relay) 23, and a starter relay (ST relay) 24. More specifically, the power source control unit 15 is connected to first ends of the coils L1 to L4 of the relays 21 to 24 via switching elements, such as FETs, which are not shown. Second ends of the coils L1 to L4 are grounded. The relays 21 to 24 are activated when an activating signal (an activating signal of H level in the first embodiment) is sent from the power source control unit 15.

The power source control unit 15 is electrically connected to a lock state detecting device, which is a lock state detecting switch 32 in the first embodiment. The lock state detecting switch 32 is included in the steering lock mechanism 31. The lock state detecting switch 32 detects whether the lock pin 34 of the steering lock mechanism 31 is in an engaged state or a disengaged state. The lock state detecting switch 32 sends a signal of L level when the steering lock mechanism 31 is in the engaged state, and sends a signal of H level when the steering lock mechanism 31 is in the disengaged state.

When receiving a start permit signal from the verification control unit 14 and a signal of H level from the lock state detecting switch 32, the power source control unit 15 turns into an engine start permit state. In this state, if the push-button type start/stop switch 19 is pressed, the power source control unit 15 sends an activating signal to the IG1 relay 22, the IG2 relay 23, and the ST relay 24. The IG1 relay 22, the IG2 relay 23, and the ST relay 24 are activated based on the activating signal, which causes contact points CP2 to CP4 of the relays 22 to 24 to be turned on. First ends of the contact points CP2 to CP4 are connected to a terminal B of a battery. A second end of the contact point CP2 is connected to the engine control unit 17 and the meter control unit 18. A second end of the contact point CP3 is connected to the engine control unit 17. A second end of the contact point CP4 is connected to an engine starter, which is not shown. When the IG1 relay 22 and the IG2 relay 23 are activated, power is supplied to the engine control unit 17 and the meter control unit 18. When the ST relay 24 is activated, the engine starter is activated. When the push-button type start/stop switch 19 is pressed, the power source control unit 15 sends a starting signal to the engine control unit 17. In the first embodiment, the starting signal is formed by a signal of H level. When the starting signal is not sent, a signal of L level is sent to the engine control unit 17. In the first embodiment, the starting signal is formed of signals (level control signal) that represent two states, which are H level and L level.

When receiving a start permit signal from the verification control unit 14 and a starting signal of H level from the power source control unit 15, the engine control unit 17 performs a fuel injection control and an ignition control. That is, the engine control unit 17 performs the fuel injection control and the ignition control in accordance with whether the starting signal is H level or L level. The engine control unit 17 detects the driving state of the engine based on an ignition pulse and an alternator output. If it is determined that the engine is running, the engine control unit 17 sends a complete combustion signal to the power source control unit 15. The complete combustion signal is formed by signals of H level. When the complete combustion signal is not sent, signals of L level are sent to the power source control unit 15. That is, the complete combustion signal is also formed by the level control signal in the first embodiment.

When receiving a complete combustion signal of H level from the engine control unit 17, the power source control unit 15 stops sending activating signal to the ST relay 24 to deactivate the ST relay 24. Then, the power source control unit 15 sends an activating signal to the ACC relay 21. That is, the power source control unit 15 controls the activation of the relays 21, 24 in accordance with whether the complete combustion signal is H level or L level. A first end of the contact point CP1 of the ACC relay 21 is connected to the terminal B of the battery. A second end of the contact point CP1 of the ACC relay 21 is connected to several electrical components of an accessory drive system.

The meter control unit 18 controls the operation of a combination meter and the like located on an instrument panel of the vehicle. When activated, the meter control unit 18 sends vehicle information signals representing, for example, the vehicle speed to the power source control unit 15.

The lock control unit 16 forms the steering lock mechanism 31 with the lock state detecting switch 32 and an actuator, which is a motor 33 in the first embodiment. The lock control unit 16 is electrically connected to the lock state detecting switch 32 and the motor 33.

Figure 2A:
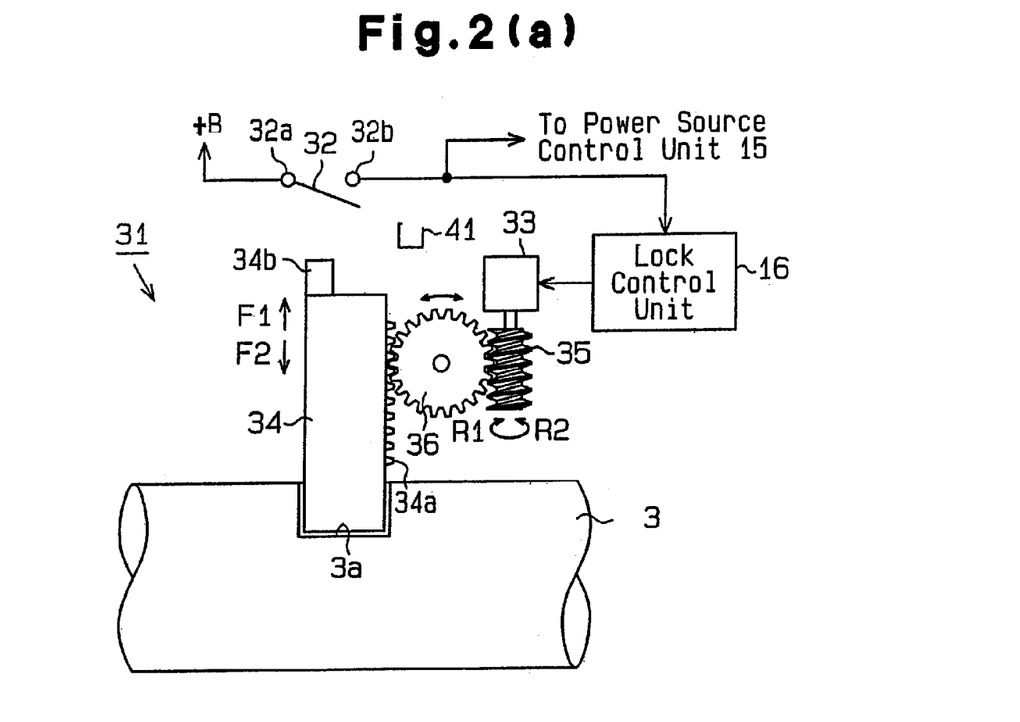
FIG. 2(a) is a schematic diagram illustrating a state in which a lock pin is engaged with a steering shaft.
Figure 2B:
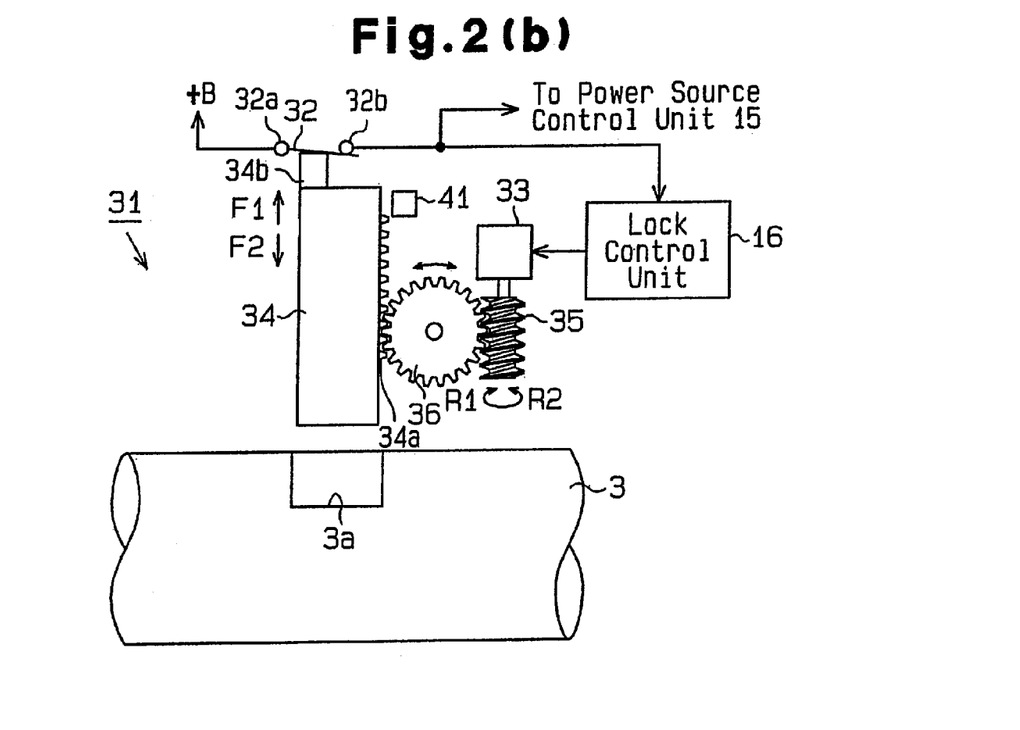
FIG. 2(b) is a schematic diagram illustrating a state in which the lock pin is disengaged from the steering shaft.

As shown in FIGS. 2(*a*) and 2(*b*), the steering lock mechanism 31 includes the lock control unit 16, the lock state detecting switch 32, the motor 33, and the lock pin 34. In the first embodiment, the lock state detecting switch 32 is a normally open (form A contact) type mechanical switch (limit switch). A first end 32*a* of the lock state detecting switch 32 is connected to the terminal B of the battery. A second end 32*b* of the lock state detecting switch 32 is connected to the power source control unit 15 and the lock control unit 16.

The motor 33 is controlled by the lock control unit 16. The motor 33 is driven when receiving a drive signal from the lock control unit 16. A worm gear 35 is coupled to a rotary shaft of the motor 33 so that the worm gear 35 rotates integrally with the rotary shaft. The worm gear 35 is engaged with a gear 36, which is located between the lock pin 34 and the worm gear 35.

The distal end of the lock pin 34 selectively engages with and disengages from a recess 3*a* formed in the outer circumferential surface of the steering shaft 3. As shown in FIG. 2(*a*), when the lock pin 34 is engaged with the recess 3*a*, rotation of the steering shaft 3 is restricted. On the contrary, when the lock pin 34 is disengaged from the recess 3*a* as shown in FIG. 2(*b*), the steering shaft 3 is rotatable.

Gear portions 34*a*, which engage with the gear 36, are formed on the outer circumferential surface of the lock pin 34. The lock pin 34 is movable in the directions shown by arrows F1 and F2 in FIGS. 2(*a*) and 2(*b*) in accordance with rotation of the gear 36. That is, the lock pin 34 selectively engages with and disengages from the steering shaft 3 in accordance with the rotation of the motor 33.

A switch actuator 34*b* is formed at the proximal end of the lock pin 34. As shown in FIG. 2(*a*), the switch actuator 34*b* is separate from the lock state detecting switch 32 when the lock pin 34 is engaged with the recess 3*a* of the steering shaft 3, that is, when the lock pin 34 and the steering shaft 3 are in a locked state. Therefore, the lock state detecting switch 32 is open. In this state, signals of L level are sent to the power source control unit 15 and the lock control unit 16. The power source control unit 15 and the lock control unit 16 acknowledge that the steering lock mechanism 31 is in the locked state based on the signals of L level.

On the other hands, as shown in FIG. 2(*b*), when the lock pin 34 is disengaged from the recess 3*a*, that is, when the lock pin 34 is located at a lock release position, the switch actuator 34*b* contacts and closes the lock state detecting switch 32. Therefore, the lock state detecting switch 32 sends signals of H level to the power source control unit 15 and the lock control unit 16. The power source control unit 15 and the lock control unit 16 acknowledge that the lock pin 34 is located at the lock release position based on the signals of H level sent from the lock state detecting switch 32. The lock state detecting switch 32 is closed when the lock pin 34 is completely disengaged from the recess 3*a* of the steering shaft 3.

When receiving a lock release request signal from the verification control unit 14, the lock control unit 16 sends an unlock drive signal to the motor 33 to release the lock. In this case, the rotary shaft of the motor 33 rotates in the direction shown by an arrow R2 in FIGS. 2(*a*) and 2(*b*), which moves the lock pin 34 in the direction shown by the arrow F1. Therefore, as shown in FIG. 2(*b*), when the lock pin 34 is disengaged from the recess 3*a* of the steering shaft 3, the lock state detecting switch 32 is closed. When receiving a signal of H level from the lock state detecting switch 32, the lock control unit 16 sends a lock release complete signal to the verification control unit 14.

The lock control unit 16 sends a lock drive signal to the motor 33 to lock the steering shaft 3 when it is determined that a predetermined condition is satisfied based on a control signal from the power source control unit 15 and an output signal from a door courtesy switch, which is not shown. In this case, the rotary shaft of the motor 33 is rotated in the direction shown by the arrow R1 in FIGS. 2(*a*) and 2(*b*), which moves the lock pin 34 in the direction shown by the arrow F2. Therefore, as shown in FIG. 2(*a*), when the lock pin 34 and the recess 3*a* of the steering shaft 3 are engaged, the lock state detecting switch 32 is open.

A start control of the engine using the one-push type engine start/stop control system 1 will now be described with reference to FIG. 3.

When the portable communication device 11 is carried into the vehicle passenger compartment, the verification control unit 14 intercommunicates with the portable communication device 11 to verify the ID code. When the ID code of the portable communication device 11 matches with the ID code stored in the verification control unit 14 as shown by a point P1 in FIG. 3, the verification control unit 14 sends the lock release request signal to the lock control unit 16. When receiving the lock release request signal, the lock control unit 16 sends the unlock drive signal to the motor 33 of the steering lock mechanism 31. The motor 33 is then actuated to move the lock pin 34 in the direction to be disengaged from the recess 3*a* of the steering shaft 3 (see FIG. 2(*b*)).

As shown in FIG. 2(*b*), when the lock pin 34 is disengaged from the recess 3*a* and the lock state detecting switch 32 is closed, signals sent from the lock state detecting switch 32 and received by the power source control unit 15 and the lock control unit 16 become H level. As indicated by a point P2 in FIG. 3, the lock control unit 16 stops sending the unlock drive signal to the motor 33 and sends the lock release complete signal to the motor 33. When receiving the lock release complete signal, the verification control unit 14 sends the start permit signal to the power source control unit 15.

When receiving the signals of H level from the lock state detecting switch 32 and the start permit signal from the verification control unit 14, the power source control unit 15 turns into the engine start permit state as indicated by the point P2. As indicated by a point P3, the engine is started when the push-button type start/stop switch 19 is pressed in the engine start permit state. Further, when the engine is started, the verification control unit 14 stops sending the request signal to the transmitter-receiver 13. Therefore, the verification result of the ID codes is in an unmatched state.

Although the power source control unit 15 receives the start permit signal from the verification control unit 14, the power source control unit 15 does not turn into the engine start permit state unless a signal of H level is sent from the lock state detecting switch 32. Therefore, the engine is not started although the push-button type start/stop switch 19 is pressed as shown by a chain double-dashed line in FIG. 3 during a time period Δt from when the unlock drive signal is sent from the lock control unit 16 till when the lock state detecting switch 32 is closed.

The first embodiment provides the following advantages.

Detection signals sent from the lock state detecting switch 32 are monitored by the power source control unit 15 and the lock control unit 16. The engine is not permitted to be started unless the disengaged state of the lock pin 34 is acknowledged by the power source control unit 15 and the lock control unit 16 based on the detection signals. Therefore, for example, although the lock control unit 16 sends the lock release complete signal to the verification control unit 14 while the lock pin 34 is in the engaged state, and the power source control unit 15 receives the start permit signal from the verification control unit 14, the power source control unit 15 does not turn into the engine start permit state unless the power source control unit 15 receives the unlock drive signal from the lock control unit 16.

For example, although the power source control unit 15 sends the starting signal to the engine control unit 17 while the lock pin 34 is in the engaged state, the verification control unit 14 does not send the start permit signal to the engine control unit 17 since the lock control unit 16 does not send the lock release complete signal to the verification control unit 14. The engine control unit 17 does not start the engine although the engine control unit 17 receives the starting signal from the power source control unit 15. That is, the engine is not permitted to be started while the steering lock mechanism 31 is in the locked state unless the power source control unit 15 and the lock control unit 16 cause malfunctions simultaneously. Therefore, the engine is reliably prevented from being permitted to be started while the lock pin 34 is engaged with the recess 3a of the steering shaft 3.

A second embodiment of the present invention will now be described with reference to FIG. 4.

Differences from the first embodiment of FIGS. 1 to 3 will mainly be discussed below, and like members are given the like numbers and detailed explanations are omitted.

Figure 4:
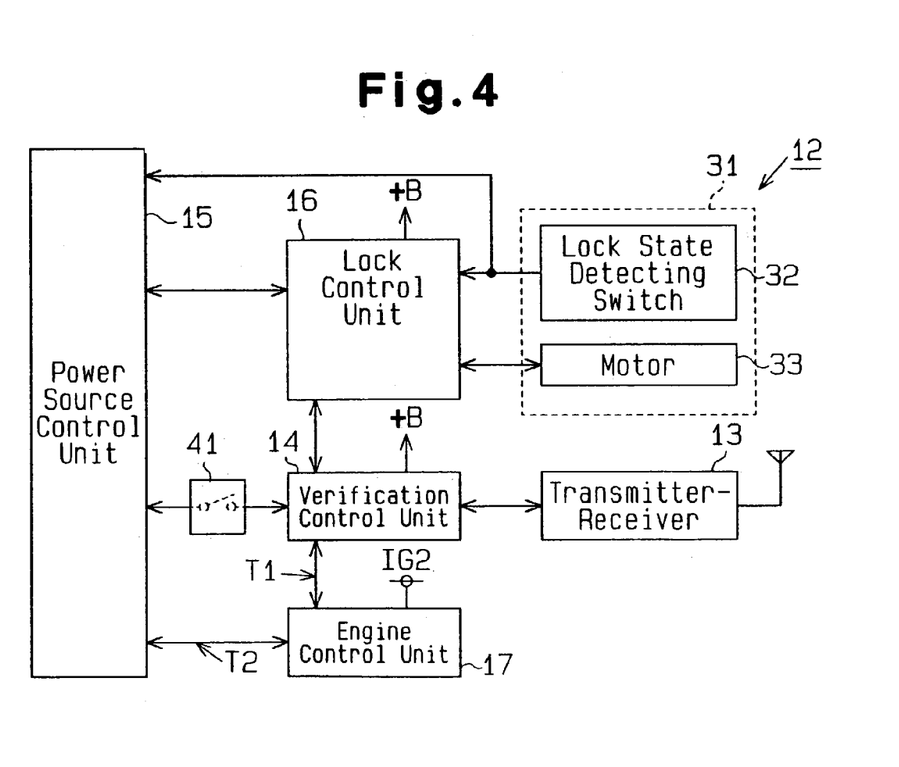
FIG. 4 is a schematic block diagram showing part of an engine start/stop control system according to a second embodiment of the present invention.

As shown in FIG. 4, in addition to the structure of the first embodiment of FIGS. 1 to 3, in the second embodiment, a switching member 41 is located on a communication pathway between the verification control unit 14 and the power source control unit 15. The switching member 41 is arranged to separate from the lock pin 34 when the lock pin 34 is in the engaged state as shown in FIG. 2(a) and approach the proximal end of the lock pin 34 when the lock pin 34 is in the disengaged state as shown in FIG. 2(b).

The switching member 41 is formed by a proximity switch utilizing a Hall element and the like. When the proximal end of the lock pin 34 approaches, the switching member 41 is turned on (see FIG. 2(b)) and when the proximal end of the lock pin 34 separates, the switching member 41 is turned off (see FIGS. 2(a)). That is, the switching member 41 is off when the lock pin 34 is engaged with the recess 3a of the steering shaft 3 and is on when the lock pin 34 is disengaged. Therefore, the communication pathway between the verification control unit 14 and the power source control unit 15 is conductive when the lock pin 34 is disengaged, and is disconnected when the lock pin 34 is engaged.

Figure 3:
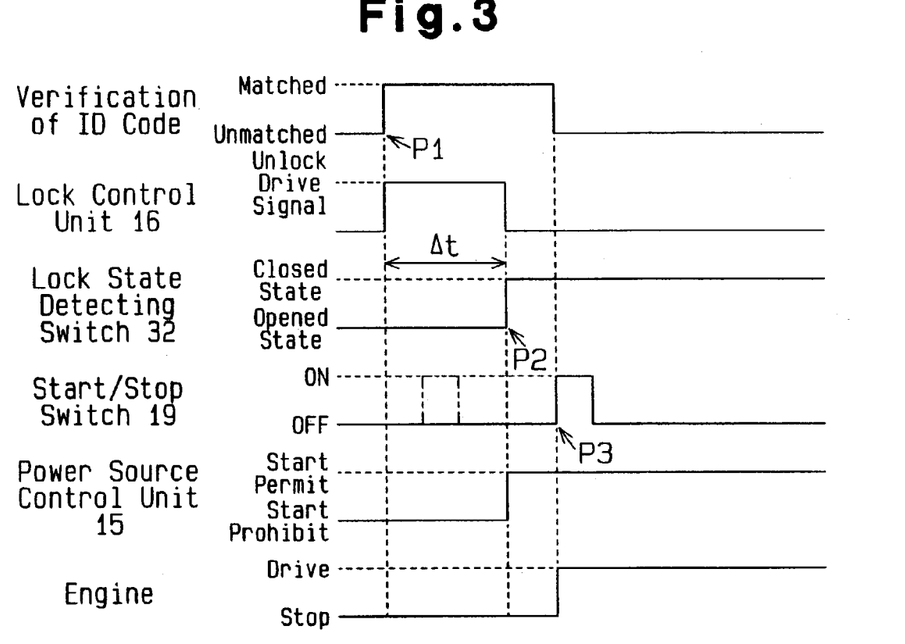
FIG. 3 is a time chart showing a start control of an engine by the engine start/stop control system of FIG. 1.

The second embodiment provides the following advantages in addition to the advantage of the first embodiment of FIGS. 1 to 3.

When the lock pin 34 is disengaged from the recess 3a of the steering shaft 3, the switching member 41 is on. In this state, the communication pathway between the verification control unit 14 and the power source control unit 15 is conductive. When the lock pin 34 is disengaged, the power source control unit 15 receives the start permit signal sent from the verification control unit 14. Therefore, the power source control unit 15 is in the engine start permit state. On the other hand, when the lock pin 34 is in the engaged state, the switching member 41 is off. In this state, the communication pathway between the verification control unit 14 and the power source control unit 15 is disconnected. Therefore, when the lock pin 34 is in the engaged state, the power source control unit 15 does not receive the start permit signal sent from the verification control unit 14. Thus, the power source control unit 15 maintains the start prohibit state of the engine. That is, the communication pathway that is used in starting the engine is disconnected if the lock pin 34 is not reliably separate from the recess 3a of the steering shaft 3. Accordingly, the engine is reliably prevented from being started while the lock pin 34 is engaged with the recess 3a of the steering shaft 3.

The switching member 41 is connected to the communication pathway between the verification control unit 14 and the power source control unit 15. The communication signal between the verification control unit 14 and the power source control unit 15 is a binary signal that consists of a predetermined number of bits having a certain pattern. For example, when the switching member 41 disconnects the communication pathway, the communication signal is fixed to the H level or the L level. Therefore, the verification control unit 14 and the power source control unit 15 acknowledge that the communication pathway is disconnected by the switching member 41. Accordingly, the operation state of the switching member 41 can be communicated to driver circuitry for the switching member 41.

It should be apparent to those skilled in the art that the present invention may be embodied in many other specific forms without departing from the spirit or scope of the invention. Particularly, it should be understood that the invention may be embodied in the following forms.

The control units for monitoring whether the lock pin 34 is engaged with the recess 3a of the steering shaft 3 need not be a combination of the power source control unit 15 and the lock control unit 16. For example, the control units may be a combination of the verification control unit 14 and the lock control unit 16, the power source control unit 15 and the engine control unit 17, or the verification control unit 14 and the engine control unit 17. At least two or more control units among the lock control unit 16, the verification control unit 14, the power source control unit 15, and the engine control unit 17 function as monitor control units for monitoring detection signals from the lock state detecting switch 32.

The control units for monitoring whether the lock pin 34 is in the engaged state need not be two. For example, as shown by a chain double-dashed line in FIG. 1, the lock state detecting switch 32 and the motor 33 may also be connected to the verification control unit 14 or the engine control unit 17 such that three or more control units monitor the engaged state or the disengaged state of the lock pin 34.

In the second embodiment of FIG. 4, the connecting point of the switching member 41 need not be on the communication pathway between the verification control unit 14 and the power source control unit 15. For example, as shown by arrows T1 and T2 in FIG. 4, the switching member 41 may be connected to the communication pathway between the verification control unit 14 and the engine control unit 17, or the communication pathway between the power source control unit 15 and the engine control unit 17. That is, the switching member 41 may be connected to any of the communication pathways among the control units 14 to 17 as long as the communication pathway is necessary for starting the engine. In the case, the switching member 41 is connected to the pathway between the power source control unit 15 and the engine control unit 17, it is desirable that the communication signal between the power source control unit 15 and the engine control unit 17 be formed of the binary signal having a certain pattern.

In the second embodiment of FIG. 4, the detection signal from the lock state detecting switch 32 need not be sent to the power source control unit 15.

In the embodiments of FIGS. 1 to 4, the lock state detecting switch 32 need not be a limit switch but may be formed of a contact switch, such as a reed switch, or a noncontact switching element formed of a proximity sensor utilizing a Hall element and the like. The switching member 41 need not be a proximity sensor but may be formed of a contact switch, such as a limit switch and a reed switch.

In the above embodiments of FIGS. 1 to 4, the lock pin 34 may be triggered to be disengaged when the verification of ID code results in a matched state and the push-button type start/stop switch 19 is pressed. In this case, it is desirable that the engine be automatically started after the lock pin 34 is disengaged.

In the above embodiment of FIGS. 1 to 4, the verification control unit 14 may be omitted and several controls may be performed by one control unit. For example, the power source control unit 15 may perform the communication control and the power source control.

In the above embodiment of FIGS. 1 to 4, the present invention is embodied in an antitheft mechanism, which is the steering lock mechanism 31. The steering lock mechanism 31 controls rotation of the steering shaft 3. However, the antitheft mechanism may be an electronic drive restricting apparatus, which restricts rotation of the vehicle wheels by a lock member that corresponds to the lock pin 34, or an electronic shift lock apparatus, which restricts the shifting operation of the shift position with a member that corresponds to the lock pin 34. That is, the antitheft mechanism is not limited to the steering lock mechanism 31 and may be any mechanism that restricts operation of the steering system or the drive system of the vehicle.

Therefore, the present examples and embodiments are to be considered as illustrative and not restrictive and the invention is not to be limited to the details given herein, but may be modified within the scope and equivalence of the appended claims.

The invention claimed is:

1. A start control apparatus for controlling the starting of an engine of a vehicle, the start control apparatus comprising:
   an antitheft mechanism, wherein the antitheft mechanism has a lock member, which selectively engages with and disengages from a movable member located on the vehicle; an actuator, which drives the lock member; and a lock control unit, which controls the actuator;
   a portable communication device held by an occupant of the vehicle;
   a communication control unit, wherein, when the portable communication device is carried into a vehicle passenger compartment, the communication control unit communicates with the portable communication device;
   a power source control unit, which controls a supply of power to electrical components of the vehicle based on a communication between the power source control unit and the communication control unit;
   an engine control unit, which controls the engine based on a communication between the engine control unit and the communication control unit and a communication between the engine control unit and the power source control unit;
   a switch located inside the vehicle passenger compartment, wherein the switch is manipulated to start the engine; and
   a lock state detecting device, which detects an engaged state and a disengaged state of the lock member with respect to the movable member,
   wherein at least two of the lock control unit, the communication control unit, the power source control unit, and the engine control unit function as monitor control units; wherein the monitor control units monitor detection signals sent from the lock state detecting device, and wherein the engine is permitted to be started on condition that all the monitor control units acknowledge the disengaged state of the lock member.

2. The start control apparatus according to claim 1, further comprising a communication pathway, which connects the lock state detecting device with the monitor control units, wherein the lock state detecting device selectively connects and disconnects the communication pathway in accordance with the engaged state and disengaged state of the lock member with respect to the movable member, and wherein each monitor control unit acknowledges the disengaged state of the lock member based on the conduction of the communication pathway.

3. The start control apparatus according to claim 2, wherein, when the lock member is engaged with the movable member, the lock member is separate from the lock state detecting device so that the lock state detecting device disconnects the communication pathway, and wherein, when the lock member is disengaged from the moveable member, the lock member contacts the lock state detecting device so that the lock state detecting device connects the communication pathway.

4. The start control apparatus according to claim 1, wherein the movable member is a steering shaft of a steering mechanism of the vehicle, and wherein the lock member is movable in a direction perpendicular to the axis of the steering shaft to be engaged with the steering shaft.

5. The start control apparatus according to claim 4, further comprising a communication pathway, which connects the lock state detecting device with the monitor control units, wherein, when the lock member is engaged with the steering shaft, the lock member is separate from the lock state detecting device so that the lock state detecting device disconnects the communication pathway, wherein, when the lock member is disengaged from the steering shaft, the lock member contacts the lock state detecting device so that the lock state detecting device connects the communication pathway, and wherein each monitor control unit acknowledges the disengaged state of the lock member based on the conduction of the communication pathway.

6. The start control apparatus according to claim 1, further comprising a plurality of communication pathways, which connect the lock control unit, the communication control unit, the power source control unit, and the engine control unit, wherein a switching member is located on one of the communication pathways that is required for starting the engine, and wherein the switching member selectively connects and disconnects the communication pathway in accordance with the engaged state and the disengaged state of the lock member with respect to the movable member.

7. A start control apparatus for controlling the starting of an engine of a vehicle, the start control apparatus comprising:
an antitheft mechanism, wherein the antitheft mechanism has a lock member, which selectively engages with and disengages from a movable member located on the vehicle; an actuator, which drives the lock member; and a lock control unit, which controls the actuator;
a portable communication device held by an occupant of the vehicle;
a communication control unit, wherein, when the portable communication device is carried into a vehicle passenger compartment, the communication control unit communicates with the portable communication device;
a power source control unit, which controls a supply of power to electrical components of the vehicle based on a communication between the power source control unit and the communication control unit;
an engine control unit, which controls the engine based on a communication between the engine control unit and the communication control unit and a communication between the engine control unit and the power source control unit;
a switch located inside the vehicle passenger compartment, wherein the switch is manipulated to start the engine;
a lock state detecting device, which detects an engaged state and a disengaged state of the lock member with respect to the movable member; and
a plurality of communication pathways, which connect the lock control unit, the communication control unit, the power source control unit, and the engine control unit,
wherein the lock state detecting device is located on a communication pathway that is required for staffing the engine, and wherein the conductivity of the communication pathway is controlled in accordance with the engaged state and the disengaged state of the lock member with respect to the movable member.

8. The start control apparatus according to claim 7, wherein the lock state detecting device is located on the communication pathway through which flows a signal formed by a binary signal that consists of a plurality of bits having a certain pattern.

9. The start control apparatus according to claim 7, wherein the lock state detecting device is a switching member, which selectively connects and disconnects the communication pathway that is required for starting the engine in accordance with the engaged state and the disengaged state of the lock member with respect to the movable member.

10. The start control apparatus according to claim 9, wherein, when the lock member is engaged with the movable member, the switching member disconnects the communication pathway that is required for starting the engine.

11. The start control apparatus according to claim 10, wherein two control units, which are connected by the communication pathway in which the switching member is located, acknowledge that the lock member is engaged with the movable member when the switching member disconnects the communication pathway.

12. The start control apparatus according to claim 7, wherein the movable member is a cylindrical steering shaft of a steering mechanism of the vehicle, and wherein the lock member is movable in a direction perpendicular to the axis of the steering shaft to be engaged with the steering shaft.

13. A start control apparatus for controlling the starting of an engine of a vehicle, the start control apparatus comprising:
an antitheft mechanism, wherein the antitheft mechanism has a lock member, which selectively engages with and disengages from a movable member located on the vehicle; an actuator, which drives the lock member; and a lock control unit, which controls the actuator;
a portable communication device held by an occupant of the vehicle;
a communication control unit, wherein, when the portable communication device is carried into a vehicle passenger compartment, the communication control unit communicates with the portable communication device;
a power source control unit, which controls a supply of power to electrical components of the vehicle based on a communication between the power source control unit and the communication control unit;
an engine control unit, which controls the engine based on a communication between the engine control unit and the communication control unit and a communication between the engine control unit and the power source control unit;
a switch located inside the vehicle passenger compartment, wherein the switch is manipulated to start the engine;
a plurality of communication pathways, which connect the lock control unit, the communication control unit, the power source control unit, and the engine control unit; and
a switching member, which is located on a communication pathway that is required for starting the engine, wherein the switching member selectively connects and disconnects the communication pathway in accordance with the engaged state and the disengaged state of the lock member with respect to the movable member.

* * * * *

UNITED STATES PATENT AND TRADEMARK OFFICE
CERTIFICATE OF CORRECTION

PATENT NO. : 7,161,262 B2  Page 1 of 1
APPLICATION NO. : 10/404344
DATED : January 9, 2007
INVENTOR(S) : Nagae et al.

It is certified that error appears in the above-identified patent and that said Letters Patent is hereby corrected as shown below:

Claim 7, column 11, line 56, delete "staffing" and insert --starting-- therefor.

Signed and Sealed this

Thirteenth Day of March, 2007

JON W. DUDAS
*Director of the United States Patent and Trademark Office*